UNITED STATES PATENT OFFICE.

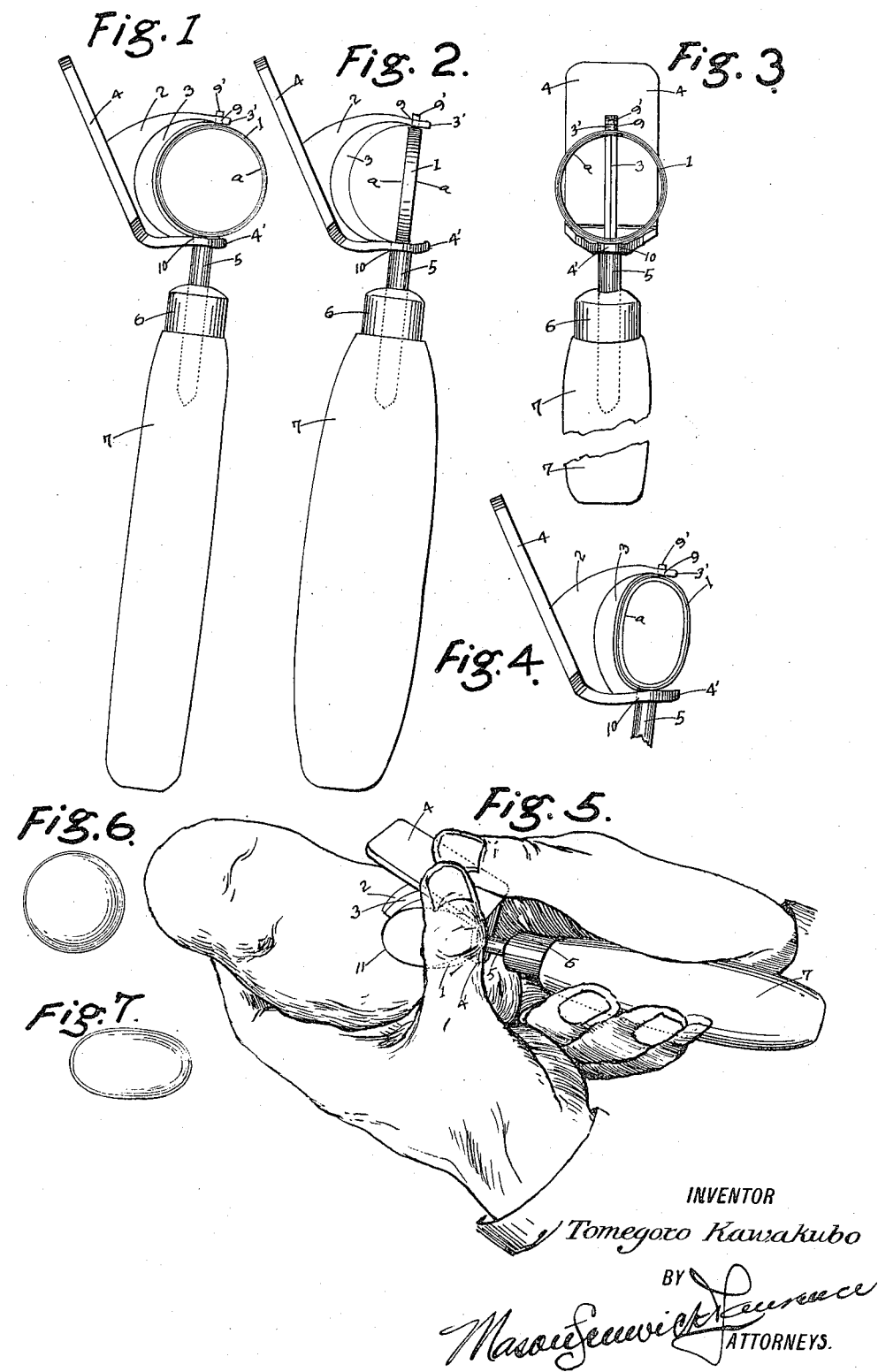

TOMEGORO KAWAKUBO, OF SEATTLE, WASHINGTON.

VEGETABLE-BALL CUTTER.

1,218,566.  Specification of Letters Patent.  Patented Mar. 6, 1917.

Application filed November 27, 1916. Serial No. 133,731.

*To all whom it may concern:*

Be it known that I, TOMEGORO KAWAKUBO, a subject of the Emperor of Japan, residing at 657 King street, Seattle, in the county of King and State of Washington, have invented certain new and useful Improvements in Vegetable-Ball Cutters, and do hereby declare the following to be a full, clear, and exact description of the invention, such as will enable others skilled in the art to which it appertains to make and use the same.

This invention relates to a device for cutting balls or other circular forms from vegetables, etc., and particularly to apparatus for cutting out balls from potatoes below the surface or skin of the potato, and preparing said ball by the operation of the cutting device.

With the object of securing a device which may be cheaply and easily constructed, and which may be used by any unskilled assistant to a cook for quickly preparing what are commonly called potato balls from potatoes commonly cooked by placing in boiling fat or oil, I have invented the following described device, for such object and other objects as may be hereinafter shown or disclosed, and for further illustrating the invention I have prepared the drawings herewith, and described as follows:

Figure 1 is a side view of the device with the circular knife in plan.

Fig. 2 is a side view of same with revolving knife in edge view.

Fig. 3 is a plan view of the ring and the thumb plate.

Fig. 4 shows another embodiment with revolving knife of oval form.

Fig. 5 illustrates the method of operation.

Fig. 6 shows the product from operation of the circular knife.

Fig. 7 shows an oval shaped product from the cutter shown in Fig. 4.

This apparatus is designed to cut out from potatoes or other vegetables, round sections, or globular portions which may be eaten or cooked in such form as they are so cut from the vegetables, and used on the dining tables both as food and for fanciful accompaniments therewith.

Like numerals represent like parts. 1 represents a circular knife or ring with sharpened edges $a$, $a$ on each side, with the inner surface of said ring flat, and the outer surface rounded similar to the construction of a narrow wedding ring after it has been long worn and its edges have become sharp. This knife 1 is fixed to a radial shaft 5 which in turn is fixed into a handle 7. On the side diametrically opposite the shaft 5 is a lug or pin 9' preferably of small diameter. A tangential thumb plate 4 is revolubly attached to the shaft by a bent bearing portion 4' of the plate 4 and the pin 9' passing through an eye 9 in a flat knife blade 2 which latter is flattened at and near its point 3'. The knife 2 is fixedly and perpendicularly attached to the plate 4 on one face thereof and has a concaved or semi-circular inner edge which is sharpened as at 3 for the purposes hereinafter disclosed. The handle is commonly made of wood or other light material and may be reinforced by a ferrule 6, and in order to give the operator a leverage thereon the handle may be flattened, which is shown by Fig. 1 and Fig. 2.

In operation the user may take a potato, or other vegetable, or fruit, as shown in Fig. 5, and holding the rotary, circular knife 1 flat on the surface of the potato, next turns and holds the plate 4 above the ring 1 so that the knife 2 is at right angles to the ring 1 with the lower sharpened edges of both knives pressed into or toward the side of the potato. Pressure is then exerted on the back of plate 4 with one or both thumbs whereby both knives are driven into the potato until plate 4 strikes the adjacent outer surface thereof, when both knives will then be embedded in the potato, the operator then gives the handle 7 a half turn which causes the circular cutter to generate a sphere. The knives may then be easily withdrawn, and a ball of potato will be found in the ring 1 free of the remainder of the potato and cut from beneath the peel. If desired to have the cuttings oval, elliptical, or egg shaped, the knife 1 may be formed, as in Fig. 4 for instance, in outline to produce the form.

In order to allow the circular cutter to generate a good sphere it must be sunken flatwise or axially into the fruit or vegetable to be cut, and then held so that as it is revolved its diametrical position in line with the shaft axis does not vary. Hence it is supported by the bearings at the ends of the arcuate knife 2 on the swinging plate 4, and to permit the ready passing or insertion of the knife 2 into the meat its leading edge is sharpened, and also to subdivide the circular, top chip formed by the insertion of the endless cutter into the meat.

I claim:

1. An apparatus for forming balls from vegetables, etc., comprising means for cutting into the vegetable including circular and flat knives rotatively connected, and means for rotating the circular knife.

2. A device for cutting portions from vegetables, etc., having a circular rotative knife, a flat curved edged knife in a plane of the diameter of the circular knife, the circular knife revolubly connected to the flat knife, a shank fixed to the circular knife with a handle, and a laterally projecting surface on the back of the flat knife.

3. A device for forming balls or other round solids from the interior of a potato, having means for cutting out a section of the potato, and means for dividing the portion of the potato above the round section.

4. A culinary implement comprising an endless double-edged cutter with a radially projecting handle at one side whereby it may be rotated, and a stop connected to the cutter for rotation about the diameter thereof.

5. A culinary implement comprising an endless curvilinear double-edged cutter with a radially projecting handle at one side whereby it may be rotated, and a stop connected to the cutter for rotation about the diameter thereof.

6. A culinary implement including a cutter for cutting solids of circular cross-sectional form from vegetables, when embedded and rotated therein, and means for preventing the change of axial position of the cutter in the vegetable.

7. A culinary implement including a cutter for cutting solids of circular cross-sectional form from vegetables, when embedded and rotated therein, and means for preventing the change of axial position of the cutter and for determining the depth of insertion in the vegetable.

8. A culinary implement comprising a rotative cutting device consisting of an endless hollow cutter with its opposite edges sharpened, and a bearing rotatively connected to diametrically opposite points of the cutter.

9. A culinary implement comprising a rotative cutting device consisting of an endless hollow cutter with its opposite edges sharpened, and a bearing rotatively connected to diametrically opposite points of the cutter having a sharpened leading edge to facilitate penetration of the substance to be cut.

10. A culinary implement comprising a rotative cutting device consisting of an endless hollow cutter with its opposite edges sharpened, and a bearing rotatively connected to diametrically opposite points of the cutter having means for limiting the depth of insertion of the cutter in the substance to be cut.

In testimony whereof I affix my signature.

TOMEGORO KAWAKUBO.